US010399110B1

(12) United States Patent
Good

(10) Patent No.: US 10,399,110 B1
(45) Date of Patent: Sep. 3, 2019

(54) RUST INHIBITOR APPLICATION SYSTEM

(71) Applicant: Rodney Good, Franksville, WI (US)

(72) Inventor: Rodney Good, Franksville, WI (US)

(*) Notice: Subject to any disclaimer, the term of this patent is extended or adjusted under 35 U.S.C. 154(b) by 99 days.

(21) Appl. No.: 15/679,376

(22) Filed: Aug. 17, 2017

Related U.S. Application Data

(63) Continuation-in-part of application No. 14/538,370, filed on Nov. 11, 2014, now abandoned.

(51) Int. Cl.

| | |
|---|---|
| ***B05C 1/02*** | (2006.01) |
| ***B05D 1/28*** | (2006.01) |
| ***B05D 7/14*** | (2006.01) |
| ***C23F 11/00*** | (2006.01) |
| ***B60S 1/00*** | (2006.01) |
| *B62D 25/16* | (2006.01) |

(52) U.S. Cl.
CPC ................ *B05C 1/027* (2013.01); *B05D 1/28* (2013.01); *B05D 7/14* (2013.01); *C23F 11/00* (2013.01)

(58) Field of Classification Search
CPC ... B05D 7/14; B05C 1/027; B60S 1/68; B60S 3/047
USPC .............................................................. 422/8
See application file for complete search history.

(56) References Cited

U.S. PATENT DOCUMENTS

| | | | | |
|---|---|---|---|---|
| 1,858,383 A | | 5/1932 | Anderson | |
| 2,145,135 A | | 1/1939 | Ryalls | |
| 2,304,281 A | * | 12/1942 | Riley | A24F 9/06 131/245 |
| 2,820,208 A | | 1/1958 | Howells | |
| 3,216,628 A | | 11/1965 | Fergusson | |
| 4,025,101 A | | 5/1977 | Hensel, Jr. | |
| 4,207,971 A | | 6/1980 | Ishikawa et al. | |
| 4,212,388 A | | 7/1980 | Vacha | |
| 4,424,838 A | | 1/1984 | Nack | |
| 5,269,547 A | * | 12/1993 | Antekeier | B62D 25/188 248/231.61 |
| 5,643,144 A | | 7/1997 | Trulaske | |
| 5,735,370 A | | 4/1998 | Nitta et al. | |
| 5,857,238 A | * | 1/1999 | Jmill | A46B 9/00 15/244.1 |
| 5,913,384 A | | 6/1999 | Williams | |
| 6,071,354 A | | 6/2000 | Williams | |
| 6,080,334 A | | 6/2000 | Heinmann et al. | |
| 6,485,212 B1 | * | 11/2002 | Bomgaars | B05C 17/00 15/244.1 |
| 8,071,200 B2 | | 12/2011 | Lyublinski et al. | |

(Continued)

FOREIGN PATENT DOCUMENTS

| | | |
|---|---|---|
| BE | 1006928 | 1/1995 |
| DE | 102012003316 B3 | 1/2013 |
| EP | 0773114 A2 | 5/1997 |

OTHER PUBLICATIONS

"Rust Prevention Tips", May 2015.

(Continued)

*Primary Examiner* — Kevin Joyner
*Assistant Examiner* — Holly M Mull
(74) *Attorney, Agent, or Firm* — Joseph T. Miotke; DeWitt LLP

(57) ABSTRACT

A rust inhibition system in which a rust inhibitor liquid is applied to a wand, which is then inserted into a cavity. The wand serves as a reservoir to provide the inhibitor liquid in areas susceptible to corrosion. A sleeve can be included to cause the inhibitor liquid to secrete from the wand.

7 Claims, 6 Drawing Sheets

(56) References Cited

U.S. PATENT DOCUMENTS

| | | | | |
|---|---|---|---|---|
| 2004/0187893 | A1 | 9/2004 | Maguire, Jr. | |
| 2006/0260079 | A1 | 11/2006 | Horton | |
| 2007/0114131 | A1 | 5/2007 | Anderson et al. | |
| 2007/0298992 | A1 * | 12/2007 | Hasinovic | C11D 3/1246 510/189 |
| 2008/0029524 | A1 | 2/2008 | Paine | |
| 2010/0212849 | A1 | 8/2010 | Smith et al. | |
| 2011/0214568 | A1 * | 9/2011 | Krantz | F16D 65/0031 95/273 |
| 2013/0333724 | A1 * | 12/2013 | Moskowitz | A47L 13/16 134/6 |
| 2014/0215736 | A1 | 8/2014 | Gomez | |

OTHER PUBLICATIONS

"3M Rust Fighter-I 08892", May 2015.
"Heavy Duty Anti Rust Aerosol Black", May 2015.
"Technical Data Sheet—Permatex Aerosol Rust Treatment", May 2007.
"POR-15 Rust Preventive Coating", May 2015.
"Rust Bullet Automotive—Rust Removal & Protective Coatings for Cars", May 2015.
Photographs of a treadmill cleaning kit (3 pages).
"How to Prevent Automotive Rust", http://auto.howstuffworks.com/under-the-hood/vehicle-maintenance/prevent-automotive-rust.htm, Oct. 2009.
"Car Rust Protection: How to Prevent Rust on a Car", http://www.carsdirect.com/car-maintenance/car-rust-protection-your-guide-to-preventing-car-rust, Jul. 2012.
"Super Start 01396—Battery Terminal Protectors", May 2014.
http://en.wikipedia.org/wiki/Corrosion_inhibitor, Feb. 2018.
http://en.wikipedia.org/wiki/Passivation_(chemistry), Apr. 2018.
http://forum.chryslerminivan.net/showthread.php/25270-What-is-the-best-rustproofing/page3, Oct. 2012.

* cited by examiner

RUST INHIBITOR APPLICATION SYSTEM

CROSS-REFERENCES TO RELATED APPLICATIONS

This application is a continuation-in-part of U.S. patent application Ser. No. 14/538,370 filed on Nov. 11, 2014 and entitled "Rust Inhibitor Application System."

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

BACKGROUND OF THE INVENTION

The present invention relates to corrosion inhibition and more specifically to a corrosion inhibition system for use in inhibiting corrosion such as rust in vehicle fenders and other vehicle components commonly susceptible to rust.

BRIEF SUMMARY OF THE INVENTION

Corrosion inhibition liquids such as rust inhibitor liquids prevent the formation and spread of corrosion such as rust by coating surfaces such as metals to prevent and remove moisture and other contaminants from contacting the coated surfaces. Such corrosion inhibition liquids are typically chemicals that react with a metallic surface, or the environment this surface is exposed to, giving the surface a certain level of protection such as corrosion inhibition or resistance. Inhibitors often work by adsorbing themselves on the metallic surface, protecting the metallic surface by forming a film. Inhibitors are normally distributed from a solution or dispersion. Some are included in a protective coating formulation. Inhibitors slow corrosion processes by either increasing the anodic or cathodic polarization behavior (Tafel slopes), reducing the movement or diffusion of ions to the metallic surface, and/or increasing the electrical resistance of the metallic surface.

Conventional systems to apply corrosion inhibition liquids to vehicles typically involve spray systems in which a spray nozzle is inserted into the cavity to be treated, such as the area between the rear quarter panel near the rear wheel well, and a corrosion inhibitor fluid is sprayed into the cavity to coat the area potentially susceptible to rust. In such systems, it is difficult to ensure that all susceptible areas are sufficiently coated. In addition, the rust inhibitor coating can become depleted, leaving areas uncoated and susceptible to rust. There exists a continuing need for a rust inhibition system that better ensures that rust inhibitor will remain in place for areas susceptible to rust such as inside the rear quarter panel of a vehicle above the wheel well.

DETAILED DESCRIPTION OF THE INVENTION

Figure 1:
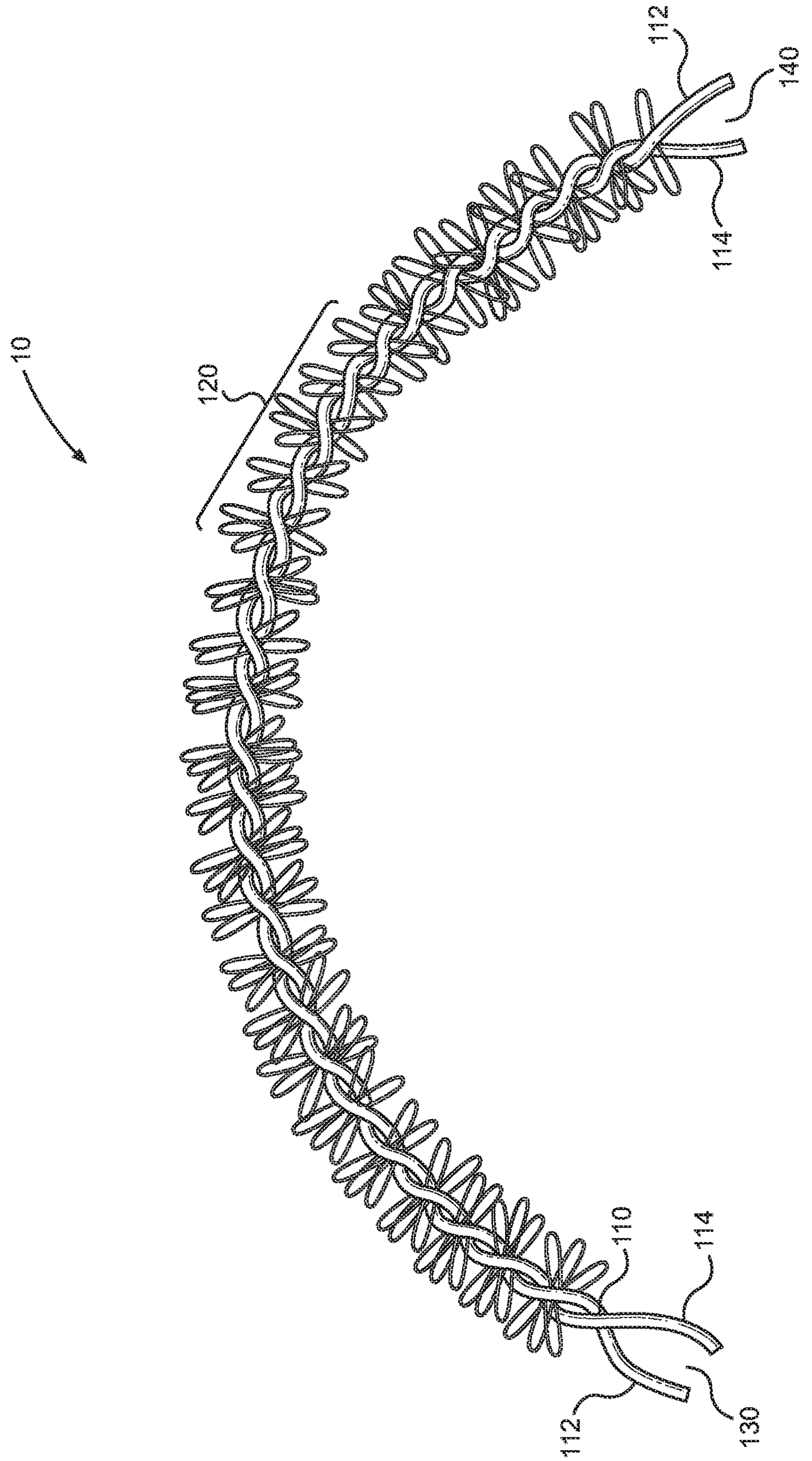
FIG. 1 is a side view of a wand according to an aspect of the present invention.

Referring to FIG. 1, a wand 10 according to one aspect of the present invention is shown. Wand 10 typically comprises a conduit 110 and a liquid absorbing material 120 that protrudes or otherwise radiates from the conduit, typically radiating in a direction generally outward from the central axis of conduit 110, which is typically the central axis of wand 10. In the embodiment shown, conduit 110 comprises a pair of twisted wires 112 and 114, into which liquid absorbing material 120 is interwoven. Any other structure or material suitable for supporting liquid absorbing material 120 may likewise be used for conduit 110. Examples of such structure include wire, rods, straw, tubing, and other pliable materials and objects.

In another aspect of the invention, liquid absorbing material 120 comprises a material suitable for absorbing and retaining a liquid such as a corrosion inhibitor, which can be a rust inhibitor. In one embodiment, the material comprises a porous, fibrous materials such as a microfiber strands similar to those found in a car wash mitt. The liquid absorbing material 120 typically includes properties suitable for absorbing and retaining a liquid with the properties of a corrosion inhibitor liquid. Material 120 also typically includes properties that enable a liquid with the properties of a corrosion inhibitor liquid to wick from the material onto a surface such as metal surface for which rust inhibition is desired. Felt, cotton, and sponge are examples of other materials suitable for use as the liquid absorbing material according to other aspects of the present invention. When a microfiber fabric is used for liquid absorbing material 120, in addition to enabling a rust inhibition liquid to wick onto the metallic surface, the fabric can also wick away corrosion particles from the surface, thereby reducing the advancement of the corrosion on the metallic surface.

Figure 2A:
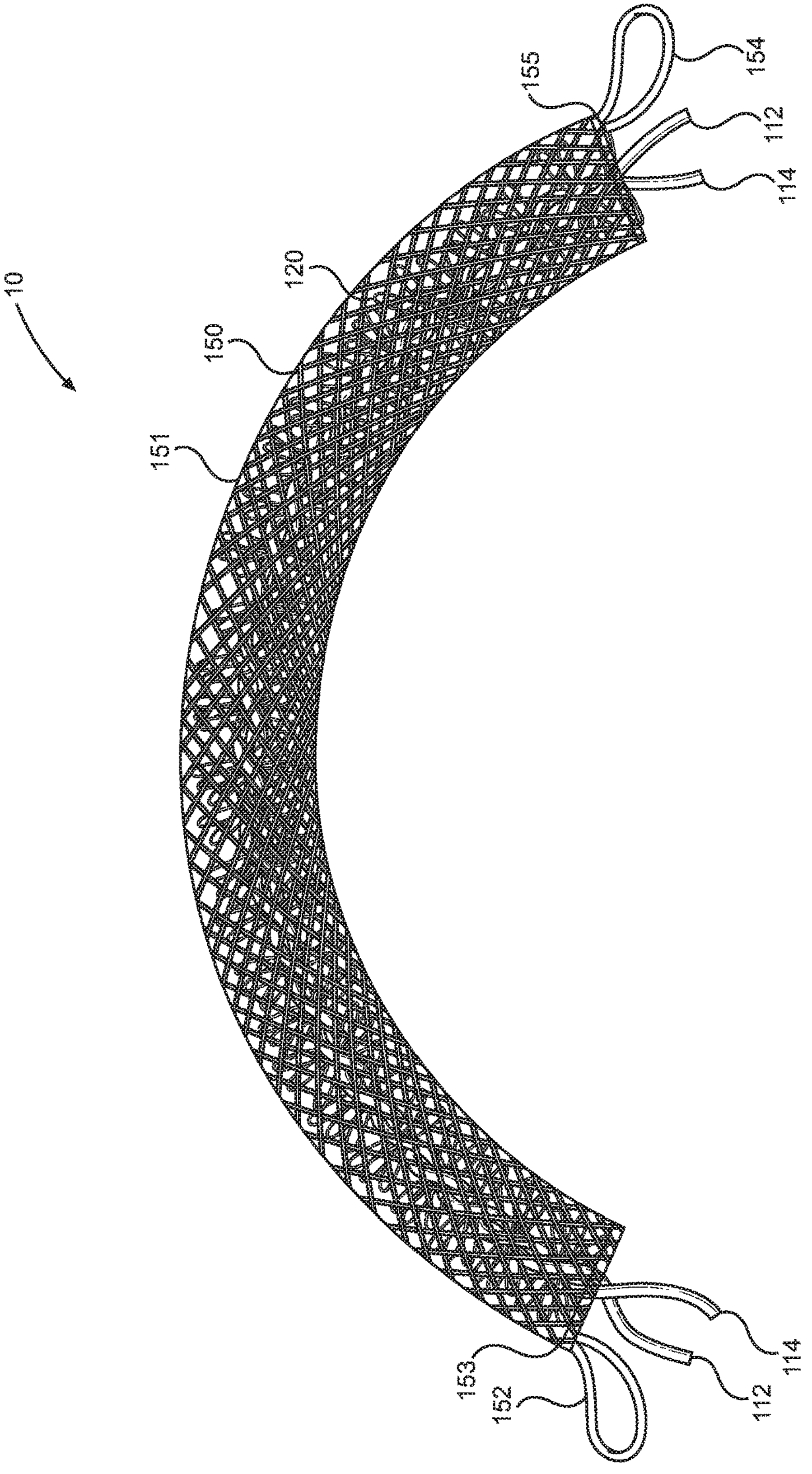
FIG. 2A is a side view of a wand that includes a sleeve.
Figure 2B:
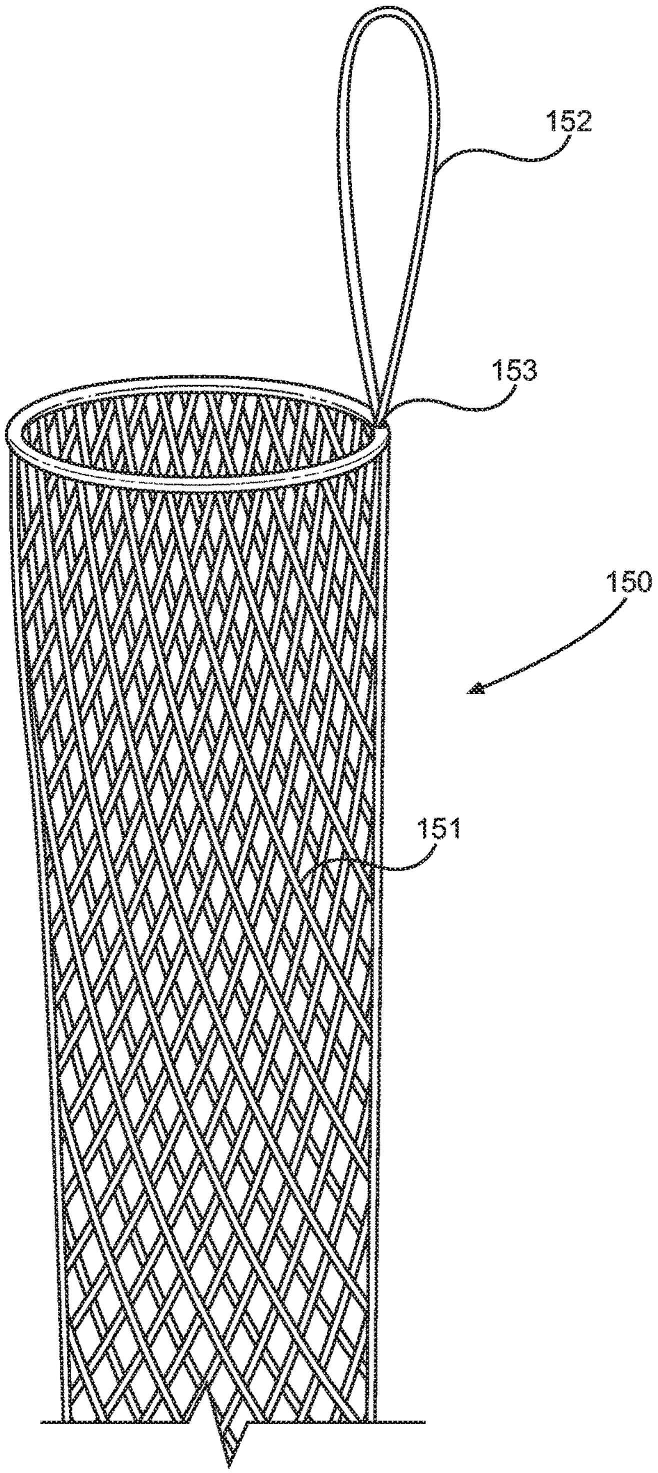
FIG. 2B is a view of a sleeve section.

Referring to FIG. 2A, in another aspect of the invention a sleeve 150 can be placed over conduit 110 and liquid absorbing material 120. In another aspect, sleeve 150 typically includes handles 152 and 154. Handles 152 and 154 are typically disposed proximate ends 153 and 155 of sleeve, but handles 152 and 154 can also be positioned at other locations throughout the length of sleeve 150. FIG. 2B shows a section of sleeve 150 that includes end 153 and handle 152 according to another aspect of the invention. In one aspect, sleeve 150 is constructed from a mesh 151, such as a woven fiber mesh material. When one or more of ends 152 and 154 are pulled in a direction away from each other, sleeve 150 to will typically increase in length and decrease in diameter. The decrease in the diameter of sleeve 150 will typically apply an inward, radial force upon liquid absorbing material 120. Such force will typically cause the liquid stored inside material 120 to secrete away from the material 120 and then towards the outer side of sleeve 150. In one aspect, sleeve 150 is constructed from a nylon mesh material. In other aspects, sleeve 150 can be constructed from a polypropylene material. In other aspects, sleeve 150 can be constructed from a woven fabric or netting having properties that permit the fabric or netting to elongate or stretch when a force is applied to the end or ends of the fabric or netting. In another aspect, sleeve 150 is constructed from a material that does not absorb liquids such as a corrosion inhibitor. In other aspects, sleeve 150 can be constructed from a material having properties that at least partially absorb a liquid such a corrosion inhibitor. In another aspect, sleeve 150 can optionally cover the entire length of wand 10. In other aspects, sleeve 150 can optionally cover a portion of the length of wand 10.

Figure 3:
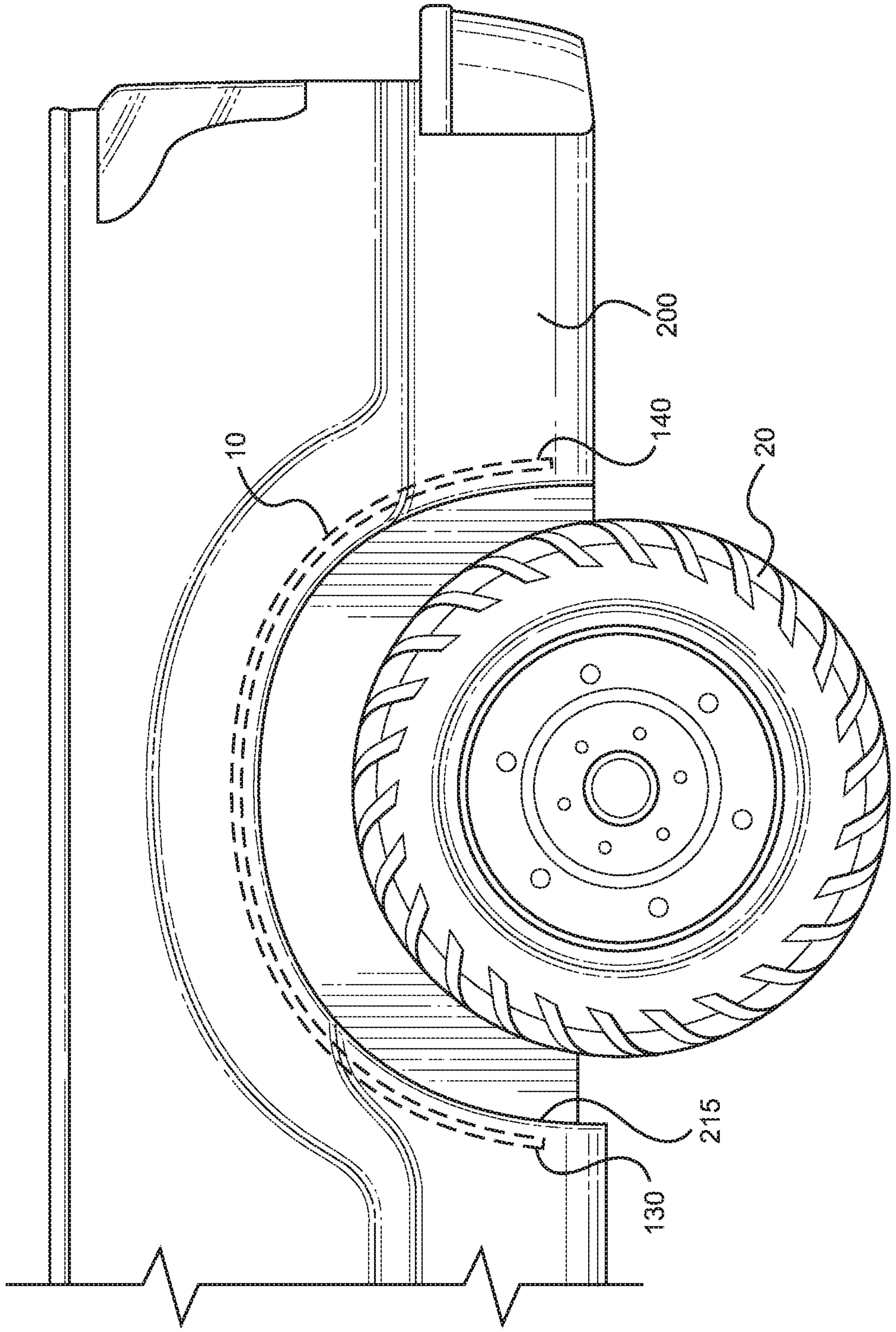
FIG. 3 is a side view of the wand installed into a fender according to an aspect of the present invention.
Figure 4:
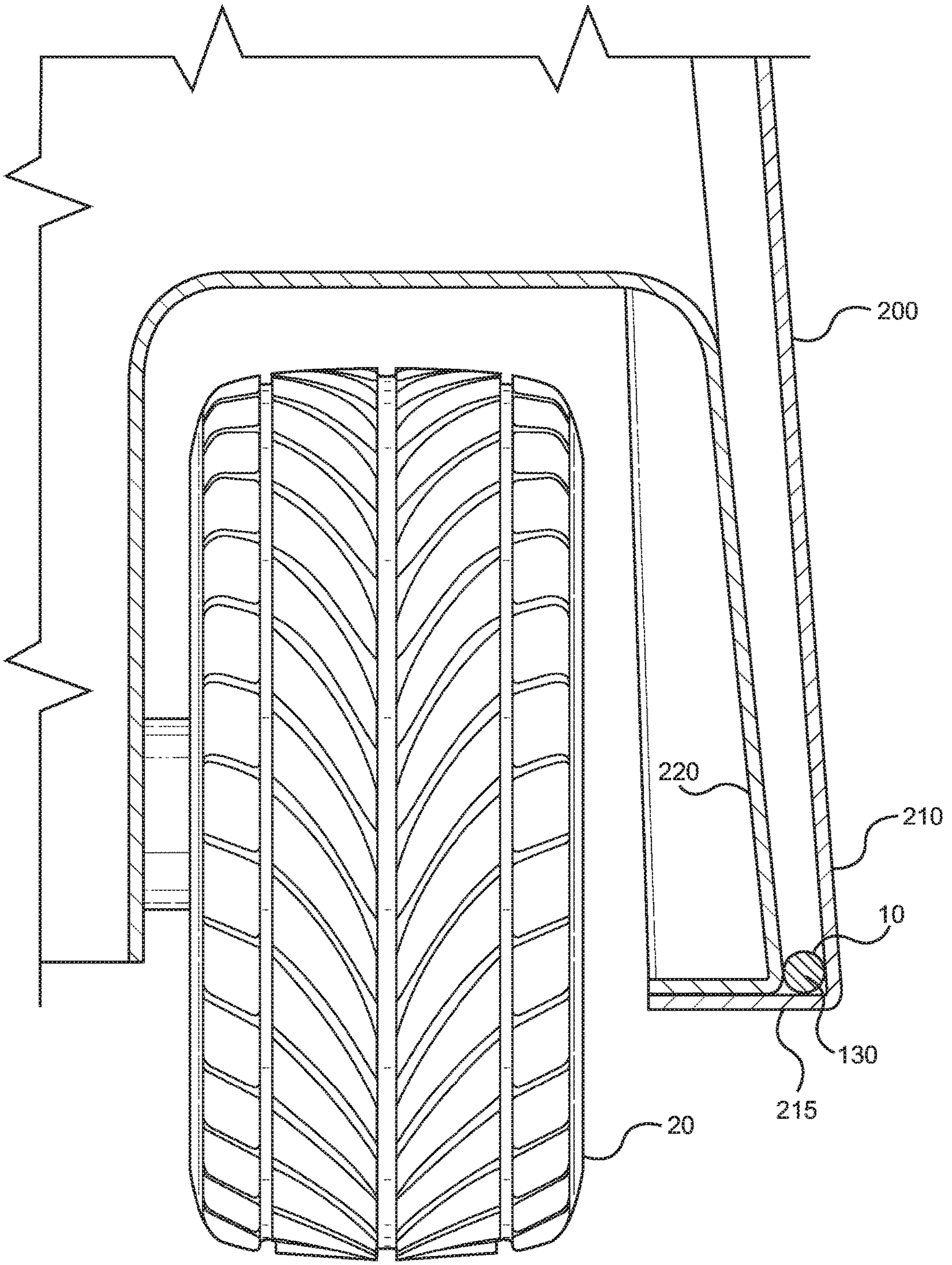
FIG. 4 is a front view of the wand installed into a fender according to an aspect of the present invention.

FIGS. 3 and 4 show a wand 10 installed into a rear truck fender 200 according to one aspect of the invention. Fender 200 typically includes an outer panel 210 and inner panel 220. Panels 210 and 220 are commonly pinch welded together during or prior to installation in the vehicle. Corrosion such as rust is a common occurrence in the rear fender 200 of trucks and other vehicles, as well as other locations throughout a variety of vehicles. Fenders 200 and other vehicle components are commonly made from steel or other similar materials. Such components are commonly painted to protect the steel or other underlying material from corrosion. When this protective paint is chipped off or otherwise damaged, the underlying material is exposed to external contaminants such as moisture, salt, and other materials. Contaminants such as moisture and salt will cause corrosion to form on the steel of fender 200 through oxidation and other chemical reactions resulting in iron oxide and other compounds. Gravel commonly becomes trapped between panels 210 and 220 and causes damage to the paint coating on panels 210 and 220. Such gravel damage is one common cause of corrosion to fender 200.

Referring to FIG. 4, wand 10 is typically installed between inner panel 220 and outer panel 210 of rear fender 200. There is commonly an opening in the vehicle wheel well into which wand 10 can be inserted. Wand ends 130 and 140 are typically cut to size and then bent around the edges of fender 200 to hold wand 10 in place. Wand 10 can likewise be installed at any other suitable location on a vehicle where rust inhibition is desired. Example of such other locations include, without limitation, rocker panels, door panels, tailgates, trunk lids, leading edges of hoods, and shock towers.

Before installation, wand 10 is typically saturated with a corrosion inhibitor liquid (not shown). One example of a corrosion inhibitor liquid that can be used in connection with the present invention is Seal Out® Backcoat 834 rust inhibitor, available from WK Products, Inc. Any other corrosion inhibitor liquid can likewise be used in connection with the present invention. Once installed between panels 210 and 220, wand 10 enables the constant presence of corrosion inhibitor fluid along the surfaces of panels 210 and 220. In another aspect, once wand 10 is installed between panels 210 and 220, one or more of the ends 152 and 154 of sleeve 150 are pulled to cause the corrosion inhibitor fluid to secrete from wand 10 and onto the surfaces of panels 210 and 220. After installation, wand 10 also typically serves a reservoir for corrosion inhibitor fluid, ensuring that corrosion rust inhibitor fluid will be present should corrosion start to form on a surface or a surface become damages and susceptible to corrosion. The corrosion inhibitor fluid typically will wick from liquid absorbing material 120 onto panels 210 and 220. The wicking is commonly the result of the capillary action of the corrosion inhibitor fluid within material 120.

Figure 5:
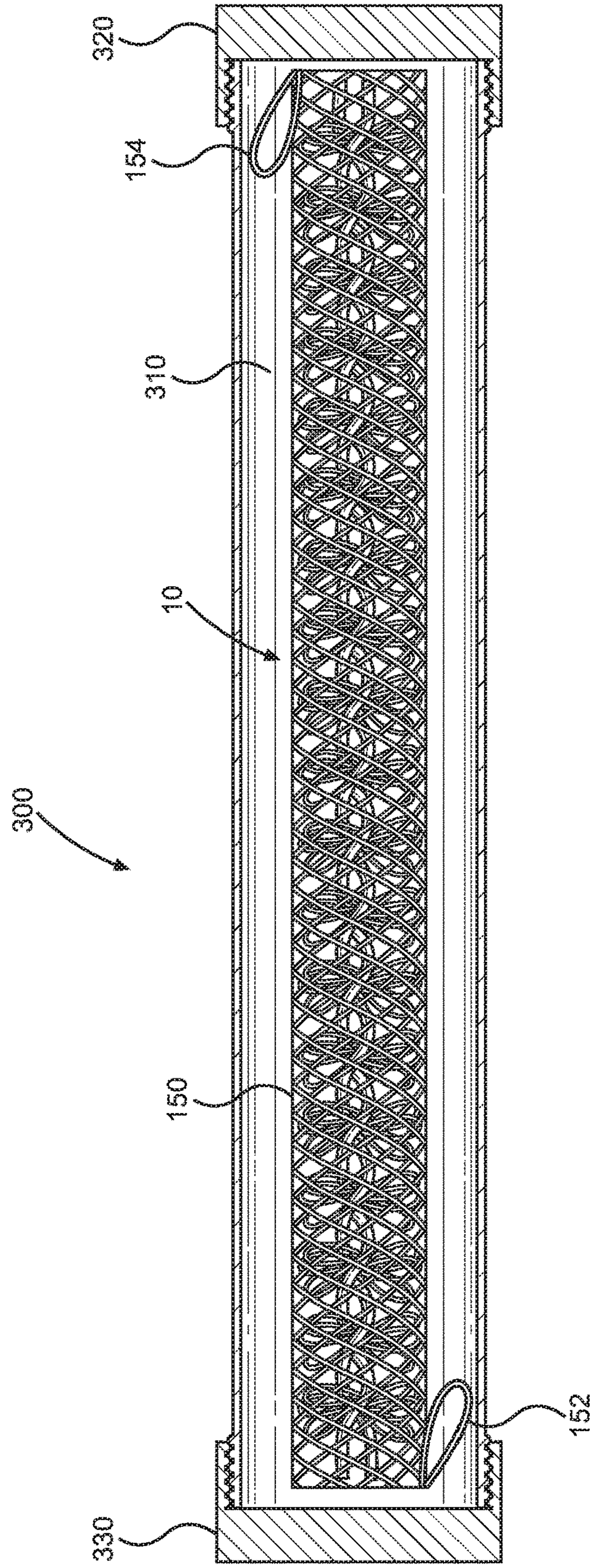
FIG. 5 is a side view of the wand inserted into a tube according to an aspect of the present invention.

Referring to FIG. 5 a storage tube 300 for wand 10 is shown. According to one aspect of the invention, storage tube 300 can be used to store wand 10 in a cavity 310 after corrosion inhibitor fluid has been pre-applied to wand 10 and absorbed by liquid absorbing material 120. Tube 300 typically includes removably attached endcaps 320 and 330. In another aspect of the invention, tube 300 can be constructed from a transparent or semi-transparent material such as a plastic, which will permit observation of wand 10 when it is stored within tube 300.

Following is an illustrative example of the use and installation of the present invention. Wand 10 is immersed in a rust inhibitor liquid such as Seal Out® Backcoat 834 rust inhibitor. Following immersion, or any other application of the corrosion inhibitor liquid to wand 10, wand 10 is inserted into tube 300, which is sealed shut using end caps 320 and 330. While enclosed within tube 300, wand 10 can be easily transported or shipped without rust inhibiting liquid unintentionally coming into contact with other items or surfaces. When desired, wand 10 can be removed from tube 300 by removing one or both of end caps 320 and 330. Referring to FIG. 2, wand 10 can then be sized by bending wand 10 to match the contour of wheel well 215, which is part of fender 200. Approximately two inches of ends 130 and 140 should extend beyond the contour of wheel well 215. Liquid absorbing material 120 can optionally be shaved or otherwise removed from conduit 110 in the event that wand 10 will be shortened such that wires 112 and 114 at ends 130 and 140 would have material 120 interwoven after shortening. A box cutter knife, or any other suitable cutting tool, can be used to shave or otherwise remove material 120 from wires 112 and 114. In one aspect, the sleeve ends 153 and 155 typically do not need to be shortened prior to installation of wand 10 into the cavity of wheel well 215. Optionally, after installation, the cutting tool can also be used to cut sleeve 150 to a desired length. As another option, the ends 153 and 155 of sleeve can be folded over and inserted into the wheel well cavity. In other aspects, handles 152 and 154 are removably affixed to the ends 153 and 155 of sleeve 150. Here, sleeve 150 can be shortened to a desired length before installation, and handles 152 and 154 can be attached or reattached to the shortened sleeve 150. In other aspects, drawstrings or other structures that can be used to apply a longitudinal force to one or both ends of sleeve 150 can be used in place of or in addition to handles 152 and 154.

In one aspect, approximately two inches of wires 112 and 114 free from material 120 will be left beyond the contour of wheel, with wires 112 and 114 used to secure wand to the fender. Now bent to approximately match the contour of wheel well 215, a user can insert wand 10 into the cavity created by the inner and outer panels 210 and 220 and then position the wand such that it rests along the contour of wheel 215 between panels 210 and 220 as shown in FIG. 4. Once inserted, one or more of ends 152 and 154 of sleeve 150 are pulled to cause the rust inhibitor to secrete from wand 10 and onto the surfaces of panels 210 and 220. Once installed, wand 10 typically provides a reservoir for a constant source of corrosion inhibiting liquid along the inner and outer panels 210 and 220, thereby reducing the likelihood that corrosion such as rust will form in this area. In the event the corrosion has already formed in this area, corrosion inhibiting liquid typically will wick from wand 10 into the corroded area, impeding the formation of further corrosion.

All patents, patent publications, and peer-reviewed publications (i.e., “references”) cited herein are expressly incorporated by reference to the same extent as if each individual reference were specifically and individually indicated as being incorporated by reference. In case of conflict between the present disclosure and the incorporated references, the present disclosure controls.

It is understood that the invention is not confined to the particular construction and arrangement of parts herein illustrated and described, but embraces such modified forms thereof as come within the scope of the claims.

The invention claimed is:

1. A method for rust inhibition comprising the steps of:

determining an appropriate length for an elongated wand that includes a liquid absorbing material that is saturated with a corrosion inhibitor liquid;

shortening the length of the wand if necessary to match the appropriate length;

bending the wand to a desired geometry that generally corresponds to a contour of a wheel well of a motor vehicle;

inserting the wand into the wheel well such that the wand rests along the contour of the wheel well; and securing at least one end of the wand to a structure on the vehicle that will hold the wand generally stationary and proximate in relation to the wheel well.

2. The method of claim 1, further comprising the step of:

applying force to at least one end of a sleeve that at least partially covers the wand to cause secretion of the corrosion inhibitor liquid from the wand and sleeve onto the wall of the vehicle cavity.

3. The method of claim 2 wherein the sleeve is comprised of a mesh material.

4. The method of claim 1, wherein the corrosion inhibitor liquid is a rust inhibitor.

5. The method of claim 1, wherein the motor vehicle is a truck.

6. The method of claim 1, wherein the elongated wand is comprised of a pair of twisted wires.

7. The method of claim 1, wherein the material extends in at least a first direction radially outward from a central axis of the wand and a second direction radially outward from the central axis of the wand, wherein the first direction and second direction are generally opposite one another.

* * * * *